E. J. PRINDLE.
METHOD OF TURNING LASTS.
APPLICATION FILED MAY 7, 1904.
996,673.
Patented July 4, 1911.
2 SHEETS—SHEET 1.
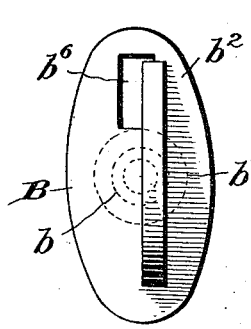
Fig. 1.
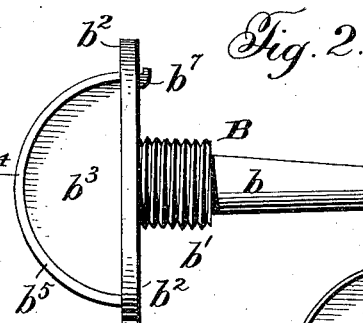
Fig. 2.
Fig. 3.
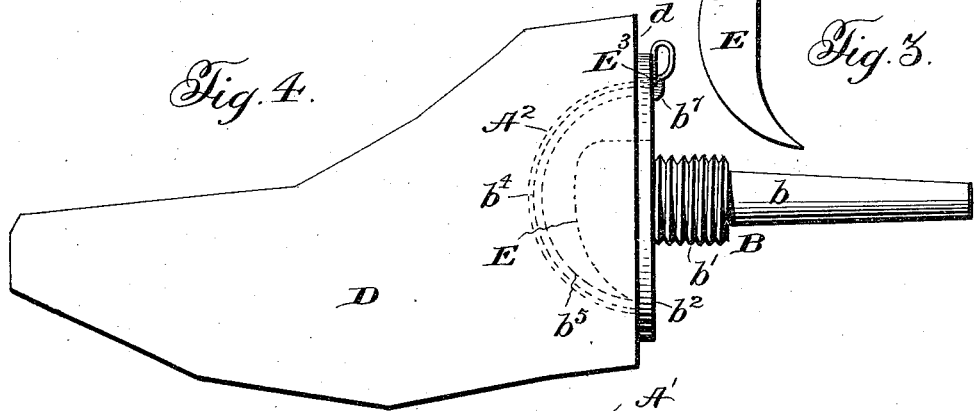
Fig. 4.
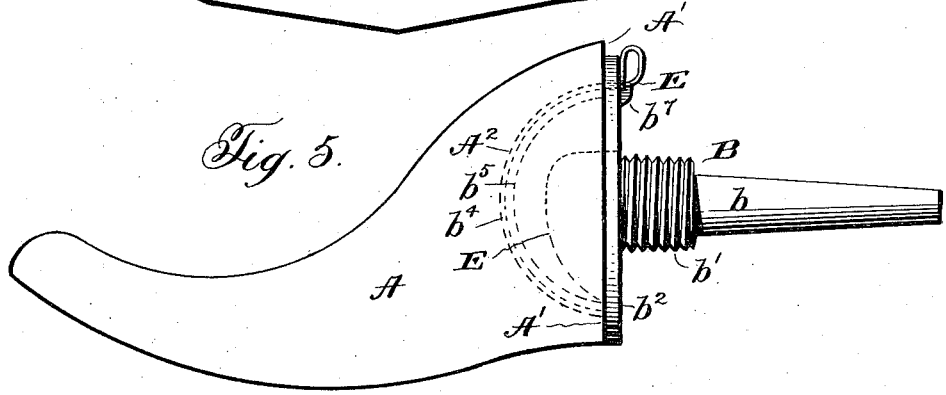
Fig. 5.
Witnesses
Jas. Les Hutchinson
J. L. Tawlor
Inventor
Edwin J. Prindle,
by Prindle and Williams, Attorneys.

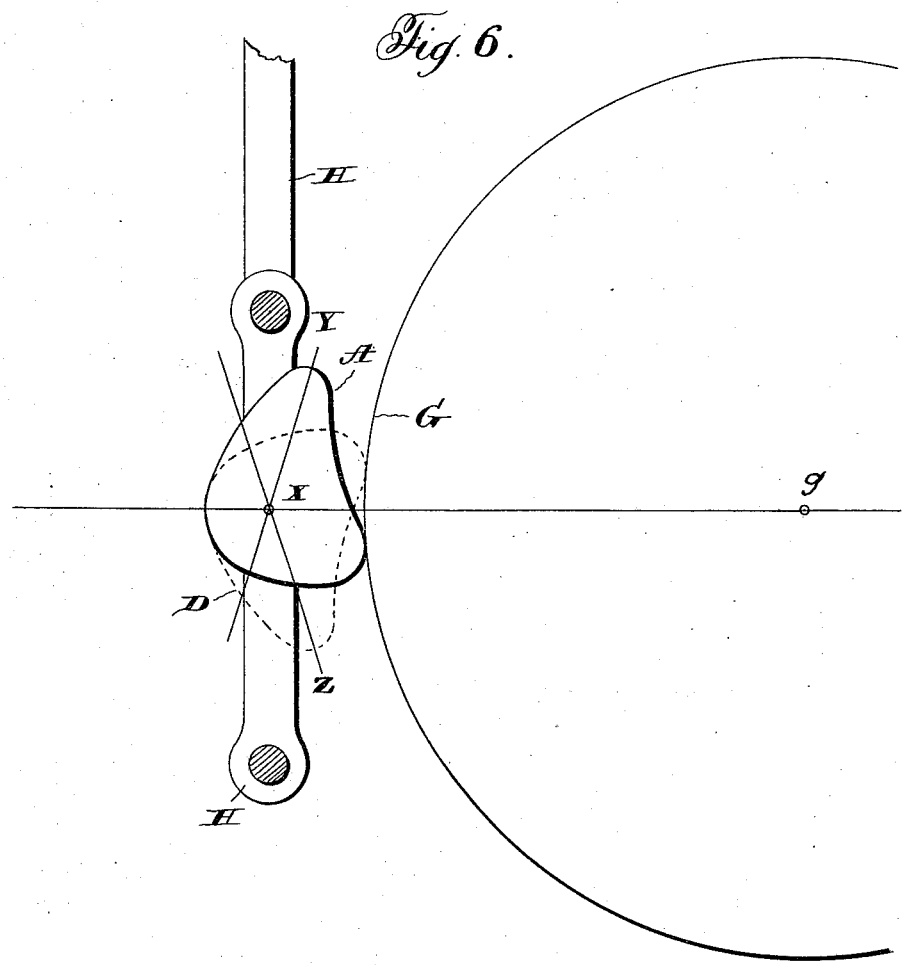

UNITED STATES PATENT OFFICE.

EDWIN J. PRINDLE, OF WASHINGTON, DISTRICT OF COLUMBIA, ASSIGNOR, BY MESNE ASSIGNMENTS, TO UNITED SHOE MACHINERY COMPANY, OF PATERSON, NEW JERSEY, A CORPORATION OF NEW JERSEY.

METHOD OF TURNING LASTS.

996,673.  Specification of Letters Patent.  Patented July 4, 1911.

Application filed May 7, 1904. Serial No. 206,947.

*To all whom it may concern:*

Be it known that I, EDWIN J. PRINDLE, of Washington, in the District of Columbia, have invented a certain new and useful Improvement in Methods of Turning Lasts, and do hereby declare that the following is a full, clear, and exact description thereof, reference being had to the accompanying drawings, in which—

Figure 1 is a dog adapted for use in carrying out my invention; Fig. 2 is a front elevation of such dog; Fig. 3 is a side elevation of a wedge which is adapted for use in securing toe-parts of lasts, or the blocks from which such toe-parts are to be formed, to the dog illustrated in Fig. 1; Fig. 4 is a side elevation of the dog illustrated in Fig. 1, and a block from which a toe-part of a last is to be formed, such block being secured on said dog; Fig. 5 is a side elevation of the dog illustrated in Fig. 1, and a toe-part of a last, such toe-part being secured to such dog; and, Fig. 6 is a transverse sectional view of the swing frame of a last lathe having my dog supplied thereto, and showing the relative position of the swing frame and model wheel, the model and the last being formed.

The object of my invention has been to devise a method of turning lasts, by the use of which a left toe-part can be turned from a right model, and vice versa, or a left heel-part can be turned from a right heel-part, and vice versa, the hinge-attaching surfaces having been previously formed, which method shall enable the hinge-attaching surfaces in the last being formed to be given precisely the same relative location to the foot-shape contour thereof as said hinge-attaching surfaces bear to the foot-shape contour in the model, and to such ends, my invention consists in the method of forming lasts substantially as hereinafter specified.

If the gearing for revolving the chuck-spindles of a last turning lathe be shifted to reverse the movement of said spindles at any period of their operation, they will, of course, turn a foot-shape contour on a reverse last, which is the reverse of that of the model. It has, however, heretofore, been a very difficult matter to cause the hinges with their jack-pin sockets in the reverse last to occupy precisely the same relation to the sole, for instance, as they occupy in the model. For instance, if the top of the heel of the model be narrow, so that there is only just sufficient room to receive the jack-pin socket when a reverse last is turned from a model, it is not only desirable, but necessary, not only to get the foot-shape contour of the reverse last exactly the reverse of the model, but it is necessary to position the jack-pin socket so that it will be wholly confined within the narrow top of the heel, and will not cut into the foot-shape contour on either side of the heel. Prior to my invention, it has been customary, when turning a reverse last part, to empirically shift the work-chuck relative to the model-chuck, or vice versa, until the jack-pin socket has been made to come into the desired position, but the operator was provided with no guide, such as a line, or a slot containing a plate which corresponded in location to a hinge plate to be subsequently attached to the finished last part, for adjustment, in a definite manner, relatively to a similar line or slot in the model. There was therefore no way of insuring that in the reverse last part the slot for receiving the hinge plate would be located in precisely the same position relatively to all portions of the foot-contour as it was in the model.

To illustrate my invention, I have selected the interchangeable toe-part A, shown in my Patent No. 648,525, granted May 1st, 1900, to which reference is made for a full description of the last. The model toe-part and the block from which the last is to be formed are to be held in a last-turning lathe by the dog or chuck illustrated in Figs. 1 to 5. Such a lathe may be that illustrated in the patent to J. B. Kimball, No. 546,160, September 10th, 1895. The dog B consists of a tapered shank $b$ having a screw thread $b'$ at its larger end, and beyond such thread having a plate $b^2$ formed thereon. A plate $b^3$ projects from the face of the plate $b^2$ in a plane perpendicular thereto, and such plate corresponds to the portion of the toe-part plate C (reference letter of said patent) of the last which is received in the toe-part A thereof past its rear surface A'. Such plate $b^3$ has an arc-shaped forward edge $b^4$, along which extends an arc-shaped flange $b^5$, said plate being adapted to fit into the slot $A^2$ of the toe-part, and to have its flange $b^5$ received in a correspondingly shaped groove in said slot. In the plate $b^2$ an opening $b^6$ is formed, to permit the passage of the wedge E of the last therethrough, and a notched ear $b^7$ is formed on the rear face of the plate $b^2$ to engage the spring $E^3$ of the wedge E of the last, as does the notch $C^3$ (reference letter of said patent) of the toe-part plate C (reference letter of said patent) of the last. To secure the model toe-part to the chuck, such toe-part A is passed over the plate $b^3$ until its rear face A′ bears squarely on the front face of the plate $b^2$, and is then moved laterally until the flange $b^5$ is seated in the arc-shaped groove $A^3$ in such toe-part. The wedge E is then inserted from the rear through the opening $b^6$, and into the slot $A^2$ in the toe-part until its spring $E^3$ engages the notched ear $b^7$, such action wedging the plate $b^3$ against a wall of the slot $A^2$ and fastening the toe-part firmly to the dog. If the dog be not already screwed or driven into its socket in the model head-stock spindle, it is secured in such socket, and the toe-part is thus firmly mounted on the spindle.

To attach the block D, from which the new toe-part is to be turned, to the work head-stock spindle of the lathe, a plane surface $d$ is formed at one end thereof, which surface is to constitute the rear surface A′ of the finished toe-part. A slot $A^2$ is then formed in such surface, a groove corresponding to the flange $B^5$ being formed in such slot. The block D is then attached to its dog in the same manner as the model toe-part is attached to the dog B. The dog is then secured to the work head stock spindle of the lathe.

So much of the procedure is the subject of my application for patent for method of forming lasts, Serial No. 19,293, filed June 6th, 1900. In turning a right toe-part from a left model, or vice versa, or in performing the same operation in connection with heel-parts, which is the object of the present invention, it is necessary that the hinged slot in the last being formed shall bear relatively the same relation to the foot-shape contour in the left last turned from the right model as such slot bears to such contour in said model; that is, in the left last, when the foot-shape contour of the toe-part is continuous and flush with the foot-shape contour of the heel-part, the hinge slot in the toe-part must be parallel to the hinge slot in the heel-part, for such is the relation between the slots in the model last. Moreover, the hinge slot in the new toe-part must be in line with precisely the same points in the periphery of the rear face of the toe-part as is the slot of the model toe-part; that is, for instance, if one slot is in a line between the crest of the cone and the middle of the sole, then the other must also be in that line. In order to secure these results, I so position the dogs upon the oppositely rotating spindles of the lathe that the surface of the plate $b^3$, which surface passes through the axis of the lathe spindle in the one dog, stands at precisely the same angle to a line passing through the said axis and the center of the model wheel as the said surface on the other dog stands to a line passing through the axis of the spindle on which the said dog rotates and through the center of the cutter-head. The dogs, of course, rotate in opposite directions. This action is illustrated in Fig. 6, in which the model wheel G rotates on the center $g$, and the model A, shown in full lines, rotates on the axis X of the swing frame H. The block D, shown in dotted lines, also rotates on the axis X on the swing frame H, and the model rests against the model wheel. The line X—Y represents the line of the surface, which passes through the axis of the dog, or the line of one wall of the hinge slot of the model toe-part, and the line X—Z represents the corresponding surface of the block dog, or of the slot in the block D. According to my present method, I cause the dogs to so rotate that the angle Y—X—$g$ shall always be equal to the angle Z—X—$g$, the line X—$g$ representing a line through the axis on which the dogs rotate and through the center of the model wheel. The result is that any given surface formed on the new toe-part always stands in precisely the same relative position to the line X—Z as the corresponding point in the model surface stands to the line X—Y, and the two toe-parts exactly correspond.

It is customary to turn both right and left lasts from the same model, and to have change gearing, such as illustrated in the patent to Kimball, above referred to, for the purpose of causing the dogs to rotate in the same direction or in opposite directions, the dogs being parallel to each other when turning a right last from a right model. By my present method, I find it most convenient to cause the change gears to be shifted to change the relative direction of rotation of the dogs when the surfaces of the two dogs which pass through the axes of the dogs are both on the line X—$g$. When the gears are shifted at this point, no adjustment whatever is required. The dogs being in proper position to turn a right last from a right model, because the surfaces which pass through the axis of the dog, being parallel, will rotate in unison, and they are in proper position to turn a left last from a left model, because the said surfaces, being both in the line X—$g$, will, upon movement of the lathe spindles in opposite directions, begin to depart from the said line at a uniform rate of motion, and at the same instant, and will, therefore, always be at the same angle to the said line. It will of course be understood that when the gears are engaged to reversely rotate the model and block, the dogs will be so arranged that like faces of the plates $b^3$ will lie on the line X—$g$ while the plates will be on opposite sides of this line, and when the gears are so engaged as to rotate the dogs in the same direction, the plates will both be located on the same side of the line X—$g$ with like faces in said line.

To restate the matter briefly as follows: Since the model wheel and cutter are coaxial, it is evident that the cutter is always forming a point on the new last which is the same as the point on the model that is being touched by the model wheel. It is apparent that if the model wheel is touching the side of the last, the cutter must also be forming the side of the last. This is true whether the block and model are revolved in the same or in opposite directions, only that when they are revolved in opposite directions the new last will be the reverse of its model. This is also true, no matter by what means the block and model are held in the lathe. From this it follows that when the model and block are held by a plate in a slot, as illustrated in the drawings of this application, the last being formed a reverse of the model will always be symmetrical with reference to the line X $g$, no matter what relation the two plates $b^3$ of the chucks may have with reference to each other. If the two plates $b^3$ are not symmetrical to each other with reference to the line X $g$, their slots in the model and last will not be symmetrical with each other, although the foot-shaped contours will be symmetrical, as the lathe cannot make the latter any other way than symmetrical. Therefore, in order that the slot in the new last may bear the same relation to the foot-shaped contour thereof that the slot in the model bears to its foot-shaped contour, it is necessary that the plates $b^3$ be symmetrical with reference to the line X $g$, since their foot-shaped contours are symmetrical. When turning a right last from a right model, the two plates $b^3$ turn in the same direction and must be maintained parallel to each other in all phases of their revolution. Since they must be symmetrical with reference to the line X $g$ when turning a reverse last, I find it most convenient to start them parallel to each other and parallel to the said line X $g$. Then when they reverse, they will always be symmetrical to said line as they depart from it in opposite directions at equal rates of speed. In this manner, reverse last parts can be obtained in which the slots bear the proper relation to the foot-shaped contour, and thus when they are assembled into their respective lasts, they will be found to fit onto the hinged connection of the complemental last part so that the two foot-shaped contours will come into proper relation with each other.

It will be seen that the lathe so forms the reverse last part that its foot-shape contour is symmetrical with the foot-shape contour of the model, the axis of symmetry being the line X—$g$, and that my causing the chucks also to be symmetrical with reference to the same axis, results in the slots in the new last part being formed in the same relation to its foot-shape contour as is the slot in the model last to its foot-shape contour. It is essential that lines in the useful surfaces of the right and left lasts which would be symmetrical when their foot-shape contours were symmetrical, should be symmetrical with reference to the line X—$g$ when turning reverse lasts.

Any mode of procedure which will bring the surface $b^7$ on the model dog and the same surface on the block dog at the same, but opposite, angles to the line X—$g$, will accomplish the purpose of my method, and I regard as coming within the scope of my invention.

It is obvious that many forms of apparatus could be devised for the carrying out of this process, and that it is applicable to the manufacture of any form of last part.

Having thus described my invention, what I claim is:—

1. The method of turning reverse last parts from a model in a last lathe, which consists in marking a line on the block previous to turning which shall agree accurately in position with a like line on the model and bear a definite relation to a hinge-attaching surface, and causing said lines to rotate about the lathe spindles in such positions as to always stand at the same, but opposite angles to a line passing through the axis of rotation of said block and model, and through the axis of the model wheel or cutter head.

2. The method of turning reverse last parts in a last lathe from a model, which consists in forming a hinge-attaching surface on the block to correspond with a similar surface on the model, arranging like lines of said surfaces in parallel relation and coincident with a line passing through the axes of rotation of the model and block and the model wheel or cutter, and causing the model and block to rotate in opposite directions at the same speed.

3. The method of turning reverse last parts on a lathe constructed to impart rotation to a model and block in the same, or opposite directions, at equal speeds, which consists in forming a hinge-attaching surface on the block corresponding to a like surface on the model, arranging the model and block so that like lines on said surfaces bear the same, but opposite, angular relations to a line passing through the axes of rotation of the model and block and the model wheel or cutter, and shifting the change gears of the lathe to cause said model and block to rotate in opposite directions.

4. The method of turning reverse last parts from a model which consists in effecting engagement between the model and block and the chucks of the lathe through corresponding plane surfaces on said parts, arranging said surfaces so that they will present the same angle to a line passing through the axes of rotation of the chucks and of the model or cutter, and causing a rotation of said model and block in opposite directions at equal speeds.

5. The method of producing last parts from a model, which consists in forming a hinge-plate attaching slot in the block which corresponds to a like slot in the model, effecting engagement between said slots and similarly shaped plates of the lathe chucks, arranging corresponding surfaces of said slots in coincidence with a line passing through the axes of rotation of the model and block and the model wheel or cutter, and causing the model and block to rotate in opposite directions at the same speed.

In testimony that I claim the foregoing I have hereunto set my hand.

EDWIN J. PRINDLE.

Witnesses:
JOSEPHINE L. LAWLOR,
KATHERINE E. LAWLOR.

Copies of this patent may be obtained for five cents each, by addressing the "Commissioner of Patents, Washington, D. C."

Correction in Letters Patent No. 996,673.

It is hereby certified that in Letters Patent No. 996,673, granted July 4, 1911, upon the application of Edwin J. Prindle, of Washington, District of Columbia, for an improvement in "Methods of Turning Lasts," an error appears in the printed specification requiring correction as follows: Page 3, line 85, the reference-numeral "$b^7$" should be stricken out and the words *which passes through the axis of the dog* inserted instead; and that the said Letters Patent should be read with this correction therein that the same may conform to the record of the case in the Patent Office.

Signed and sealed this 1st day of August, A. D., 1911.

[SEAL.]

E. B. MOORE,
*Commissioner of Patents.*